United States Patent
Mura

Patent Number: 6,081,372
Date of Patent: *Jun. 27, 2000

[54] STEREOSCOPIC MICROSCOPE WITH CONVERGENT OPTICS PROVIDED WITH A SLOT LAMP FOR VIDEO RECORDING

[75] Inventor: Sergio Mura, Scandicci, Italy

[73] Assignee: C.S.O. SRL, Florence, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/752,314

[22] Filed: Nov. 19, 1996

[51] Int. Cl.[7] .............................. G02B 21/22; G02B 21/36
[52] U.S. Cl. .......................... 359/377; 359/363; 359/368
[58] Field of Search ..................... 359/368–369, 359/372–378, 380, 384, 420–422, 432, 363, 656–661; 351/217, 224

[56] References Cited

U.S. PATENT DOCUMENTS

| | | | |
|---|---|---|---|
| 4,138,191 | 2/1979 | Peyman et al. | 359/377 |
| 4,277,130 | 7/1981 | Takahashi | 359/363 |
| 4,640,588 | 2/1987 | Tanaka | 359/377 |
| 4,657,356 | 4/1987 | Matsumura | 359/377 |
| 4,674,845 | 6/1987 | Matsumura | 359/377 |
| 4,991,947 | 2/1991 | Sander et al. | 359/375 |

*Primary Examiner*—Thong Nguyen
*Attorney, Agent, or Firm*—McAulay Nissen Goldberg & Kiel, LLP

[57] ABSTRACT

A stereoscopic microscope which makes use of two pairs of lenses, each pair having a different magnification. Both pairs of lenses are supported in a disk-shaped drum along a pair of orthogonally related diameters and rotatable through an angle of 90° by a draw lever to place the two pairs of lenses alternatively in position for use by an operator for a direct observation of the image of the patient's eye structure and for all operating functions of a video recording camera. The optical scheme makes use in one direction of a right-angle prism arrangement for deviating rays from a patient's eye in an opposite direction, towards the video recording camera. Two reflecting prisms are provided along the direct observation position through the pairs of lenses aligned with eyepieces of the microscope and the operator sees the image reproduced by the first pair of lenses in presence of one magnification or by the other pair of lenses in the presence of the other magnification with rectified images in both cases by reflecting prisms.

19 Claims, 2 Drawing Sheets

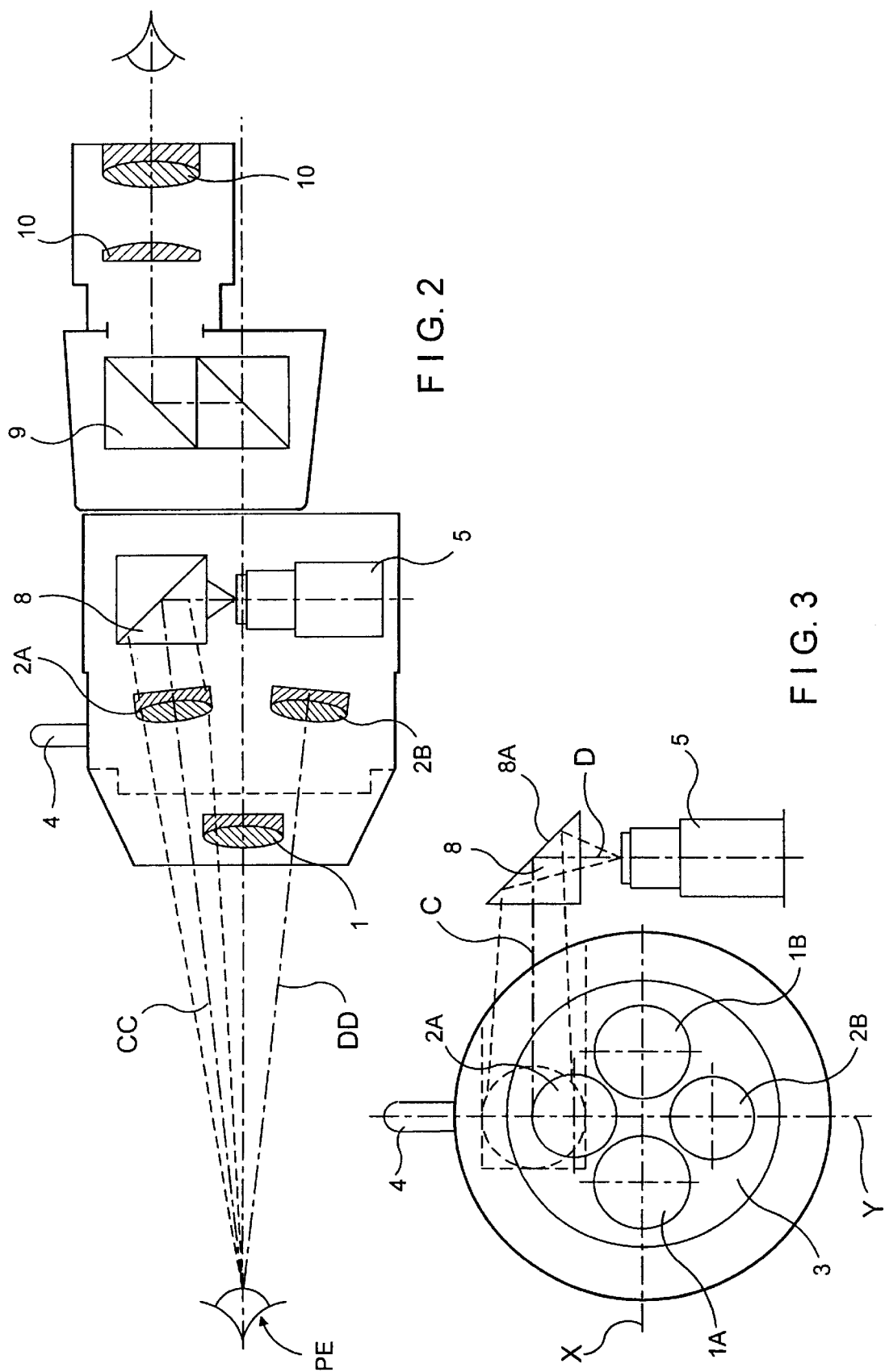

STEREOSCOPIC MICROSCOPE WITH CONVERGENT OPTICS PROVIDED WITH A SLOT LAMP FOR VIDEO RECORDING

BACKGROUND OF THE INVENTION

FIELD OF THE INVENTION

This invention is concerned with a stereoscopic microscope having convergent optics for the diagnosing of certain pathologies of the eye by means of a biomicroscopic examination.

More specifically, the invention is concerned with a stereoscopic microscope making use of the "Tyndall effect", by transmission onto a monitor of a much larger light image which, from direct observation, solves the problem of the image loss of light due to a taking away caused by the presence of a connection device for video recording with no direct intervention on an optic observation axis.

The current technologies allow biomicroscopic examinations with a physician's direct vision of eye structures and a deep light image much enlarged made possible by using a device denoted as a "slot lamp" which gives a perception of a blade gap of the light projected with a depth effect on the structures of the eyeball under examination.

At present, these images are reproduced by means of Galilean-type microscopes fitted with video recording equipment, which film them for the file to be used by the operator or examiner and also for statistical data. These operative associate sections, however have a drawback that, as the transmission of the images for viewing and recording takes place on the same axis, the video recording system absorbs some of the brightness necessary for the operator, who is observing the image directly, according to a value varying between 30% to 50%. For the above stated reasons, therefore, the image formation of the light blade gap which allows a deep bearing of the eye structures, according to the Tyndall effect, is rather difficult and causes eye fatigue to operators.

To reduce the aforesaid drawback, the equipments today in use can dispose of an axial transverse vibrator on which an enlarging lens can be fixed by means of an optical separator, which conveys the light in such a way that it can be used in part for the direct observation of the image and in part for the video recording. Nevertheless, some of the light is taken away as all equipment, from the eye-piece to the output lens, comes into the optical way with the well-known consequences.

SUMMARY OF THE INVENTION

The present invention solves the above stated problems by means of a stereoscopic microscope with convergent optics in which the video recording system does not come in directly along the operator's observation optical axis. In particular, the invention includes a stereoscopic microscope which makes use of a first pair of lenses with a magnification of 16× and a second pair of lenses with a magnification of 10×. Both pairs of lenses are supported by a disk-shaped drum which can be rotated through an angle of 90° by means of a draw lever to place each of the pairs of lenses in such a position so that they can be used by the operator for a direct observation of the image of the patient's eye structure and they can be used to project the image of the patient's eye directly onto a video camera without interfering with a full operating function of either the operator's direct observation or a direct viewing by the video recording camera. The optical scheme or arrangement comprises a pair of right angle prisms and a pair of ray directing lenses positioned between said pair of prisms for changing the direction of the rays through an angle of 180° so that the rays can be directed towards a video camera that has its image receiving lens displaced 180° from the observer who is observing the rays from the patient's eyes through the microscope. The optical arrangement makes use in one direction of the first right-angle prism for deviating the rays from the patient's eye onto the pair of ray directing lenses and then causes the rays to be displaced in the opposite direction by the second right-angle prism for deviating the rays from the patient's eye directed to the first right angle prism towards the lens of the video camera.

With respect to the two reflecting prisms which are provided, each includes an axis parallel to each other and another axis aligned with each other, and they do not interfere with the observation axes and then onto two ocular groups which include ocular groups, one for each axis. From the observation position through each of the ocular groups including the eye pieces, which are the lens or lenses including reflecting prisms and the eye pieces of the microscope, then the operator sees the image reproduced by the first pair of lenses, in presence of the magnification of 16×, or by the second pair of lenses in presence of the magnification of 10×, with rectified images in both cases produced by the reflecting prisms.

The operator looks at the patient's eyes by observing each eye individualy through the first pair of lenses. The operator uses his (her) left eye to observe through one of the 16× lenses and the other eye to observe through the other 16× lens, and then the same procedure is completed through the 10× lenses. Either the first or second pair of lenses, which is not used for the direct observation of the image has its axis out of alignment with the reflecting prisms, is utilized for the transmission of the images along a third axis directed towards the video camera by means of the direction changing the right-angled prisms. In this way, an interference condition is avoided, and the direct observation of the image is made possible for the operator with the complete utilization of all of the available brightness.

As an alternative to or a modification of the use of the right-angled prisms, it is possible to use a mirror deviation system to change the ray direction directed to the video camera by 180°.

It is therefore a purpose of the invention to provide for a stereoscopic microscope with convergent optics and a slot lamp for video recording including the first pair of lenses with a magnification of 16× and the second pair of lenses with a magnification of 10×, wherein both of the pairs of lenses are supported by the disk-shaped drum, which can be rotated through an angle of substantially 90° to place each of the couples of lenses in such a position to be used by an operator for the direct observation of the image of the patient's eye and for use with an operating function of the video camera. The disk can also be rotatable in either direction as well as through an angle of 360° so that the viewer can change the lenses directing the rays from the patient's eyes to the video camera. For this purpose, it is proposed to make use in one direction of the right-angle prism for deviating rays from the patient's eye onto the lenses and in an opposite direction for deviating onto the lenses towards another right-angle prism for deviating the rays towards the wide camera.

Two reflecting prisms and two spaced ocular groups are featured on observation of two spaced axes.

From the observation position through the ocular groups the operator sees the image reproduced by the first pair of lenses in the presence of a magnification of 16× or by the second pair of lenses in presence of a magnification of 10× with rectified images in both cases by the reflecting prisms.

As noted heretofore, the axis of each of the individual pair of lenses which is not used for the direct observation of the image by the observer has one of its lenses utilized for the transmission of the images on a third axis to the video camera, and an interference condition is avoided so that the direct observation of the image by the observer/operator is made possible for the observer/operator with a complete utilization of all of the brightness available.

A feature of the invention is that instead of using right-angle prisms, it is possible to use a mirror deviation system to direct the rays from the patient's eyes towards the video camera.

Other objects, advantages and the nature of the invention will become apparent from the detailed description of the invention taken together with the accompanying drawings.

BRIEF DESCRIPTION OF THE DRAWINGS

In order that the invention may be readily carried into effect, reference is made to the accompanying drawings, in which:

FIG. 2 is a longitudinal sectional and partially schematic view of the stereoscopic microscope displaced 90° from the sectional view shown in FIG. 1, showing a third axis and with the lenses displaced through an angle of ninety degrees from their FIG. 1 position and the light rays in another flat planar projection displaced from the position in FIG. 1 by 90° starting from the eye under examination and showing only one observation axis and bent by ray bending prisms imparting a deviation angle towards the recording video camera to provide a video recording; and FIG. 3 is a partial sectional and partially schematic view of the stereoscopic microscope showing the rotatable disc, the video recording camera and one right angle prism from an examination position with the first pair of lenses for directing the rays towards the eyepieces and the second pair of lenses for directing the rays towards the video recording camera so that the first pair of lenses can be used for the observation of the direct image and the second pair of lenses can be used by the video recording camera for the video recording, and rotation of the rotatable disc through an angle of 90° changes the lenses receiving the rays from the patient's eyes.

DESCRIPTION OF THE PREFERRED EMBODIMENTS

Figure 1:
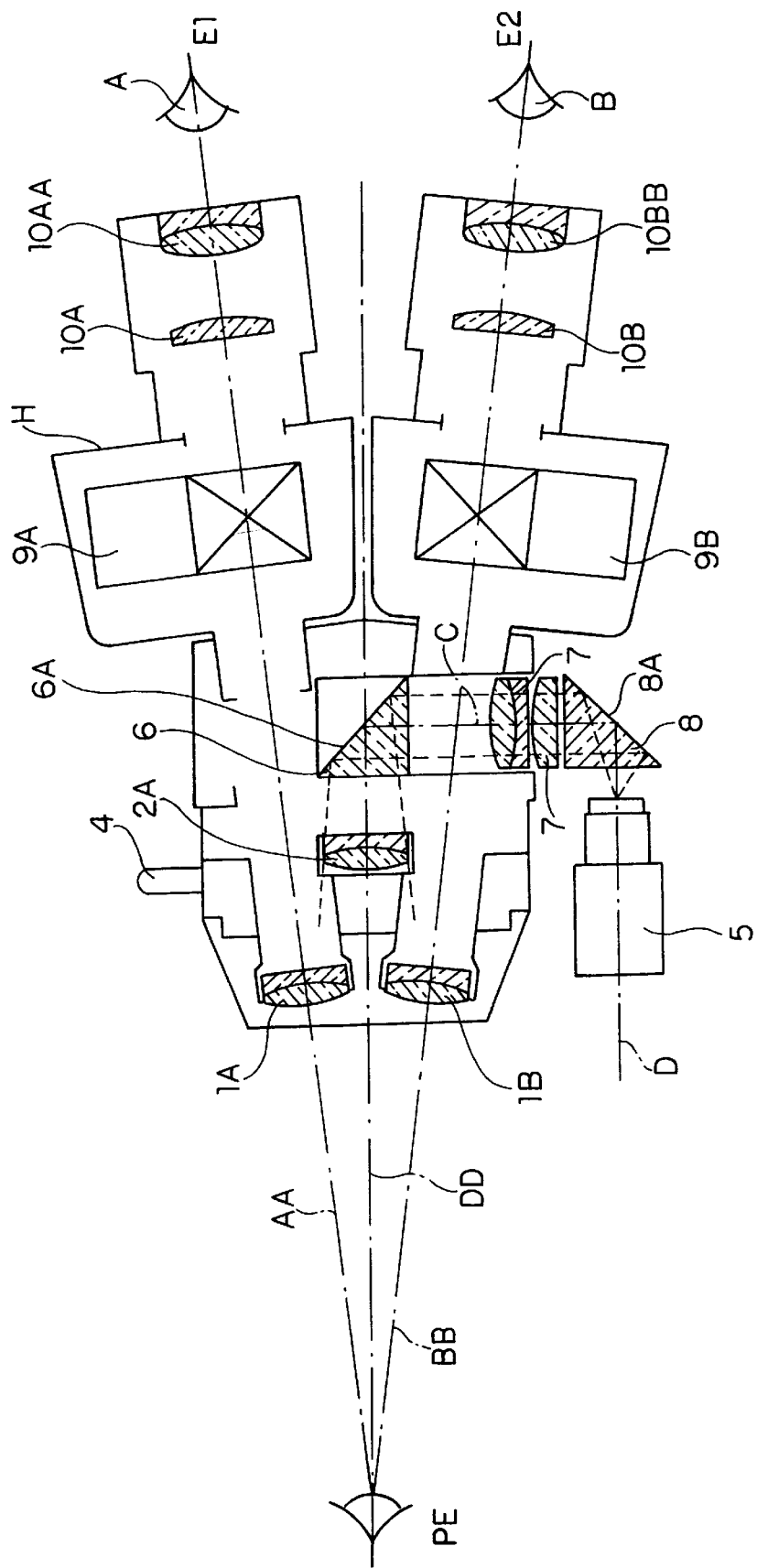
FIG. 1, is a longitudinal sectional view and partially schematic of a stereoscopic microscope according to the invention showing two observation axes and the light rays in one flat planar projection starting from the eye under examination and extending towards the viewing eyepiece and towards the recording video camera.

Referring now to the drawings, and in particular to FIGS. 1 and 3, which illustrates a stereoscopic microscope shown positioned between a patient's eye PE to be examined and a representation of the eyes E1, E2 of an individual observer or an operator conducting a biomicroscopic examination, comprising a housing H for housing a first pair or couple of lenses 1A and 1B each having a magnification of 16× and a second pair or couple of lenses 2A and 2B each having a magnification of 10×. The first pair of lenses 1A and 1B and second pair of lenses 2A and 2B are supported in a disk-shaped drum 3 (see FIG. 3) rotatably housed in said housing H with the two oppositely disposed lenses of the first and second couples or pairs 1, 2 being supported and displaced from each other at an angle of 180° from each other and on a common first axis X for the first pair of lenses 1A and 1B; and, the second pair of lenses 2A and 2B are also supported in disk-shaped drum 3 at an angle of 180° displaced from each other on a common second axis Y. The first common axis X passing through the first pair of lenses 1A and 1B is orthogonal to the second common axis Y passing through the second pair of lenses 2A and 2B, and the angle between each lens of the first pair of lenses adjacent to each lens of the second pair of lenses is 90°.

The stereoscopic microscope includes two channels for directing the rays from the eye PE along axis AA through lens 1A and along axis BB through lens 1B to the examiner's or operator's eyes E1, E2, respectively.

PE represents a patient's eye which is to be viewed by the operator or individual using the stereoscopic microscope and E1 and E2 each schematically shows and designates the eyes of the viewer.

E1 and E2 delete they while indicated as representing an examiner's eyes, they can also be considered to schematically represent the two individual eyepieces of the stereoscopic microscope. Rays from the patient's eye PE are directed along and about axis AA in a cone-shaped manner through lens 1A of the first pair of lens 1 to a reflecting prism 9A which turns over the image of 180° towards ocular groups 10 comprising lenses 10A and 10AA to observation area A of eye piece E1, and in a similar manner, rays from the patient's eye PE are also directed along and about axis BB in a cone-shaped manner through lens 1B of the first pair of lenses 1 to (which turns over the image by 180°) 9B towards observation area B by means of ocular groups 10 comprising lenses 10B and 10BB.

At the same time, rays from the patient's eye PE are directed towards the second pair of lenses 2A and 2B, and as better seen in FIG. 2, the rays are directed along and about a central axis CC in a cone-shaped manner towards lens 2A, and along and about axis DD in a cone-shaped manner towards lens 2B and along a central axis (not shown) and directed towards a video recording camera 5 by means of an optical arrangement (see FIG. 1) including a pair of right angle prisms 6, 8 and a pair of ray directing lenses 7.

As best seen in FIG. 1, both lenses of the first pair of lenses are viewed along observation areas A and B, with one lens 1A of the first pair of lenses 1 being aligned with axis AA, and the other lens 2A of the first pair of lenses being aligned with axis BB. Axis AA and Axis BB extend from a common viewing position from the patient's eye PE and extend to the eyes E1 and E2 of the examiner towards observation areas A and B, respectively and form an acute angle therebetween, and are displaced equally about a central axis between axes AA and BB and in FIG. 1 it is spaced behind or hidden by axis DD from a central point of the patient's eye PE and extends centrally between viewing areas A and B.

The lenses labeled 1A, 1B, 2A and 2B as indicated are disposed on a rotatable disk-shaped drum, as best seen in FIG. 3; however, in FIGS. 1 and 2, these lenses are schematically shown with respect to the eye pieces and facilitate viewing of this arrangement, the lenses are not shown in the same plane of the drum.

Observation areas A and B are disposed about axes AA and BB, respectively and generally form a cone-shaped configuration with the apex of the cone being at the patient's eye and the base of the cone being at the observer's or operator's individual eye.

Lever 4 (see FIG. 3) is connected with disk-shaped drum 3 for rotation thereof through an angle of 90° to place each of the first and second pair of lenses in such a position to be used by an operator for the direct observation of an image of a patient's eye and for an operating function of the video camera 5, so that the stereoscopic microscope can have the first pair of lenses rotated by means of disk-shaped drum 3 out of alignment with axes AA and BB and bring the second pair of lenses 2 into alignment with axes AA and BB, that is, the longitudinal sectional view of the microscope shown is displaced 90° from the position of the microscope in FIG. 1 so that both pairs of lenses 1 and 2 can be used for examination purposes of a patient's eye.

Video camera 5 is shown in FIGS. 1 and 3 and is provided with a central axis through its lens, and as being associated with the rays extending along a central axis which passes through the intersection between axes X and Y from the patient's eye PE which is a central axis in the center between the eyes E1 and E2 of the examiner as shown in FIG. 1 and between axes AA and BB and axes CC and DD in FIG. 2. The rays along and about an axis CC passing through the upper lens 2A of the pair of lenses 2 as seen in FIG. 3 impinges onto a right angle prism arrangement including prisms 6 and 8 and a pair of ray directing lenses 7 therebetween and are bent through an angle of 180° and are received by video camera 5. The rays along and about axis DD which is in front of axis CC pass through lens 2B.

In FIG. 1, the rays from the patient's eye PE pass through the lens 2A in FIG. 1, which is the upper lens in FIG. 2 and impinge onto right angle prism 6 and are bent through an angle of 90° for direction along an axis C. The axis CC is a central axis for the rays from a patient's eye PE which pass through the upper lens 2A of the pair of lenses 2 and is to be distinguished from axis DD as shown in FIG. 2 which passes between the pair of lens 1 and impinges onto lens 2B, the lower lens in FIG. 3. In FIG. 1, the central axis DD is shown as passing between the pair of lenses 1A and 2B.

In FIGS. 1 and 3, the pair of lenses 1 include lens 1A and 1B, and lenses 2 are represented by lens 2A which is in front of lens 2B which are shown in FIGS. 2 and 3. In FIG. 2, for the sake of simplicity, the pair of lenses 1 represents lenses 1A and 1B.

Referring now to FIGS. 2 and 3 reference is made, in particular to rays along and about axis CC from the patient's eye PE which extend towards the upper lens 2A of the pair of lenses 2 and the rays which extend towards lens 2B along and about axis DD from the patient's eye PE. As viewed in FIG. 3, the light rays transmitted along axis CC impinge onto prism 6 and are rotated through an angle of 90° and then pass along and about an axis C and pass through a pair of ray directing lenses 7 and impinge onto right angle prism 8 and the rays are rotated through an angle of 90° and impinge onto the lens of video camera 5 along axis D. The rays from the patient's eye PE which pass through lens 2B do not impinge onto right angle prism 8, and the rays passing are transmitted through lens 2B directly to video camera 5.

When disk-shaped drum 3 is rotated through 180°, then lens 2B is moved into the position of lens 2A in the drawing and the rays now passing through lens 2B impinge onto right angle prism 6 and are rotated by the right angle prism 6 through an angle of 180° by the optical arrangement and exit from right angle prism 8 after passing through the pair of ray directing lenses 7.

Referring now to all of the drawings, video camera 5 is arranged at one side to receive the light rays transmitted from the patient's eye PE. As seen in FIG. 1, light rays about and along axis AA pass through lens 1A of the first pair of lenses 1, and is directed to examiner's eye E1, and light rays passing or transmitted about and along axis BB through lens 1B of the first pair of lens 1 is directed to examiner's eye E2, and the light rays passing through lens 2A of the second pair of lenses 2 impinges onto a ray diverting member or means including a prism for changing the direction of the rays for directing the rays towards another right angle prism 6 for imparting another 90° angle change and directing the rays to the video camera 5 along and about axis D.

The ray diverting member or optical arrangement includes as shown a right angle prism 6 for changing the direction by 90° and directing the rays diverted through an angle of 90° onto the pair of lenses 7 for directing the rays onto the other right angle prism 8 for changing the direction the rays by an additional 90° for directing the rays towards the video camera 5.

As seen in FIGS. 1 and 3, the rays passing through lens 2A of the second pair of lenses 2 is directed by right angle prism 8 onto video camera 5, and when lever 4 rotates disk-shaped drum 3 through an angle of 90° from the FIG. 3 position, the rays from one of the lenses of the first pair of lenses 1 are directed towards the video camera 5.

With the invention, there is no interference between the rays directed towards the operator and the rays directed towards the video camera.

Right angle prisms 6 and 8 may be provided on inner surfaces 6A and 8A respectively with a mirrored surface and provide for a mirror deviation system.

While there is shown what is considered to be the preferred embodiments of the present invention, various changes and modifications may be made therein without departing from the scope of the invention.

What is claimed is:

1. Apparatus comprising a video recorder and a stereoscopic microscope having an objective section, eyepieces, two different pairs of lenses, and convergent optics for diagnosing certain pathologies and for video recording, said two different pairs of lenses being alternatively positionable proximate to the eyepieces and to the video recorder for transmission of information including rays alternatively to the eyepieces and to the video recorder, said microscope having a central axis extending from a position between the eye-pieces and a patient's eye to be viewed by an operator comprising:

a first pair of lenses (1) having a first magnification and a second pair of lenses (2) having a second magnification different from said first magnification;

means for supporting said first and said second pair of lenses in a rotatable disk-shaped drum (3), said central axis being substantially perpendicular to said drum;

means including a draw lever to rotate said drum through an angle of 90° to place each of said first and said second pair of lenses in such a position to be used by an operator for a direct observation of an image of a patient's eye and for an operating function of the video recorder for transmission of the information including the rays thereto;

means for directing rays from the patient's eye towards said video recorder for video recording by said video recorder comprising a first substantially right-angle prism (6) and a second substantially right-angle prism (8), a pair of lenses (7) having a central axis orthogonally related to one axis of said right angle prisms and aligned with another axis of said right angle prisms;

said first right-angle prism (6) deviating the rays onto said pair of lenses (7) and said second right-angle prism (8)

deviating the rays from said pair of lenses (7) towards said video recorder (5);

a pair of reflecting prisms and ocular groups (10) aligned on an observation axis in observation areas (A and B), respectively, said observation axis in each observation area (A and B) being angularly displaced from said central axis;

said ocular groups (10) being located on an observation position from which the operator sees an image reproduced by said first pair of lenses (1) in the presence of said first magnification or an image produced by the second pair of lenses (2) in presence of said second magnification and said reflecting prisms (9) reflecting images in both cases; and said video recorder (5) cooperating with one of said first or second pair of lenses (1) or (2) which is not used for the direct observation of the image is utilized for the transmission of information including images on an axis (D) of said video camera (5), capable of transmission to a monitor whereby to avoid an interference condition, the direct observation of the image being made possible for the operator with the complete utilization of available brightness.

2. The apparatus as claimed in claim 1, wherein said supporting means includes said rotatable drum for supporting said first pair of lenses along a first diameter, and for supporting said second pair of lenses along a second diameter displaced substantially 90° from said first diameter, said first pair of lenses being spaced from said second pair of lenses axially between the patient's eye and the operator.

3. The apparatus as claimed in claim 2, wherein said observation axis includes first and second axes, said first axis intersects said central axis and defines a first direct observation axis from one eye of the operator towards the patient's eye under examination and said second axis intersects said central axis and defines a second direct observation axis from the one eye of the patient towards the operator.

4. The apparatus as claimed in claim 2, including a housing for rotatably housing said disk-shaped drum, said disk-shaped drum being rotatable through an angle of 360°, while maintaining said lenses axially relative to each other between the patients eye and the operator.

5. The apparatus as claimed in claim 1, wherein said observation axis includes first and second axes, said first axis defining a first direct observation axis from one eye of the operator towards the patient's eye under examination and said second axis defining a second direct observation axis from the one eye of the patient towards the operator, and said first and second axes intersect said central axis.

6. The apparatus as claimed in claim 1, including a housing for rotatably housing said disk-shaped drum, said disk-shaped drum being rotatable through an angle of 360°, while maintaining said lenses axially relative to each other between the patients eye and the operator.

7. The apparatus as claimed in claim 6, wherein said housing includes two channels for directing rays from an eye under examination towards the operator's eyes, said first pair of lenses including first and second displaced lenses displaced and held by said disk-shaped drum, and said second pair of lenses being displaced from said first pair of lenses.

8. The apparatus as claimed in claim 1, wherein said first pair of lenses has a magnification 16× and the second pair of lenses has a magnification 10×.

9. A stereoscopic microscope having a central axis and having two different magnifications with identical luminosity for each magnification, comprising:

a first pair of lenses having a 16× magnification to provide one magnification;

a second pair of lenses having a 10× magnification to provide another magnification;

a disk-shaped drum having a drum central axis coinciding with the microscope central axis for supporting said first and said second pair of lenses and including means for rotation of said disk-shaped drum;

a video recording camera having a central axis angularly displaced from the drum central axis;

a pair of spaced eye-pieces angularly displaced from said microscope central axis and each having an axis intersecting said central axis and each other, and being displaced from said video recording camera and displaced from said drum central axis;

said rotation means for rotating said first and said second pair of lenses alternately between said video recording camera and said pair of eye-pieces to direct rays from a patients eyes in a cone-shaped manner through the first and second pair of lenses to said eye-pieces and to said video recording camera;

a first angled prism, a second angled prism for deviating a ray in a direction opposite to an angle of deviation of said first angled prism, and a lens positioned between said first and second angled prisms;

each of said angled prisms have an axis parallel to each other and another axis aligned with each other, and the axes of said prisms do not interfere with an observation axis of the operator used for a direct observation of an image of the patient's eye; and first and second reflecting prisms angularly displaced from each other to prevent interference between rays directed towards said first and said second pair of lenses.

10. The stereoscopic microscope as claimed in claim 9, including a housing for rotatably housing said disk-shaped drum, said disk-shaped drum being rotatable through an angle of 360°, and a pair of viewing lenses housed in said housing and aligned for viewing a patient's eye by an operator through the lenses in said disk-shaped drum aligned with said pair of viewing lenses.

11. The stereoscopic microscope as claimed in claim 10, wherein said housing includes two channels, one channel for each lens of said pair of viewing lenses for directing rays from the eye under examination towards an operator's eyes, said first pair of lenses including first and second spaced lenses spaced from each other along a diameter passing through an axis about which said disk-shaped drum rotates and held by said disk-shaped drum free of interference with said second pair of lenses.

12. The stereoscopic microscope as claimed in claim 9, wherein said disk-shaped drum is a rotatable member for supporting said first pair of lenses along a first diameter, and for supporting said second pair of lenses along a second diameter displaced 90° from said first diameter and for supporting said first Pair of lenses and said second pair of lenses axially displaced from each other.

13. The stereoscopic microscopic as claimed in claim 9, including a housing for supporting a pair of operator viewing lenses, one for each lens of said first or said second pair of lenses, said observation axis includes first and second axes, said first axis defining a first direct observation axis for one lens of said pair of operator viewing lenses from one eye of the operator towards the patient's eye under examination and a second direct observation axis for the other lens of said pair of operator viewing lens from the one eye of the patient towards the operator, said first axis passing through said one lens of said pair of lenses, and said second axis passing through the other lens of said pair of lenses.

14. The stereoscopic microscope as claimed in claim 9, wherein said observation axis includes first and second axes, said first axis defining a first direct observation axis from one eye of the operator towards the patient's eye under examination and said second axis defining a second direct observation axis from the one eye of the patient towards the operator.

15. The stereoscopic microscope as claimed in claim 9, including a housing for rotatably housing said disk-shaped drum, said housing including two channels for directing rays from an eye under examination towards an operator's eyes, said first pair of lenses including first and second spaced lenses spaced from each other axially and angularly and held by said disk-shaped drum along a common axis transverse to an axis of each of said two channels.

16. The stereoscopic microscope as claimed in claim 9 provided with a housing having two channels, one channel for each lense of said pair of viewing lenses for directing rays from the eye under examination towards an operator's eyes, said first pair of lenses including first and second spaced lenses spaced from each other along a diameter passing through said drum central axis about which a disk-shaped drum rotates and held by said disk-shaped drum free of interference with said second pair of lenses, said housing being rotatable through an angle of 360 degrees.

17. The stereoscopic microscope as claimed in claim 9, wherein said first angle prism is a right angle prism and said second angle prism is a right angle prism.

18. The stereoscopic microscope as claimed in claim 9, wherein said first and second prisms changes the direction of the rays by deviating them through an angle of 180°, and said video recording camera being substantially angularly positioned with respect to said axes of said pair of spaced eye-pieces for receiving the rays transmitted through said pair of ray directing lenses.

19. The stereoscopic microscope as claimed in claim 17, wherein said video recording camera is substantially orthogonally positioned with respect to said axes of said pair of spaced eye-pieces.

* * * * *